Patented Aug. 29, 1933

1,924,685

UNITED STATES PATENT OFFICE 1,924,685

ANÆSTHETIC COMPOSITION

Samuel D. Goldberg, Brooklyn, N. Y., assignor to Novocol Chemical Mfg. Co. Inc., Brooklyn, N. Y., a corporation of New York

REISSUED

No Drawing. Application December 6, 1930
Serial No. 500,671

10 Claims. (Cl. 167—52)

This invention relates to substances and particularly anæsthetic solutions for hypodermic injection and processes for producing the same. It is known that the hypodermic injection of acid-containing substances of this type often causes as an after-effect considerable pain and swelling at and around the place where the injection was made. I have found that this is due almost entirely to the compositions and properties of the liquid used. I have also found that such solutions have sometimes a delayed action due also in large part to the character of the solution.

The principal object of the invention accordingly is to provide a composition for local anæsthesia, which shall do away with or substantially lessen the pain, swelling and other objectionable symptoms resulting from hypodermic injection thereof while accelerating at least to some extent the anæsthetic effect desired; another object is to provide a simple process for producing such composition.

The invention accordingly comprises the novel compositions and component mixtures comprised in such compositions, as well as the novel processes and steps of processes according to which such compositions may be manufactured, specific embodiments of which are described hereinafter by way of example only and in accordance with what I now consider the preferred manner of practicing the invention.

It has been discovered that when a highly acid material having a hydrogen ion concentration of pH 1–2 is injected into the tissues there is rapid buffering of the acid or neutralization thereof by the reserve alkali of the body (carbonates and phosphates) which are called upon to effect this neutralization. This rapid buffering occurs at the point of injection to protect the tissues there from complete destruction. The resultant buffering simply limits the area where the destruction of tissue occurs, but destruction of the tissue within the area proceeds. I have discovered that with acid solutions of lower acid concentration such as those of pH 3–4, upon injection thereof into the tissues there is no immediate neutralization by the body alkalies. In fact the buffering action of the alkalies is so slow that the sloughing destruction or irritation of tissue may occur over a large area. Highly acid solutions also have the known property of readily dissolving and preserving from oxidation easily decomposible substances such as epinephrin. On the other hand such highly acid solutions are apt to produce considerable toxicity and in addition I have observed an objectionable specific effect of high acid concentrations when used with anæsthetic solutions containing epinephrin. The observation that I have made is that when the highly acid solution is injected there is an absorption of the epinephrin through the capillaries which are swelled by the acid and so distributed to the body fluids. After the acidity has been neutralized these capillaries will contract and then and only then will the vaso constricting action of the epinephrin become effective. It is that interval in which the capillaries have become enlarged and carry the epinephrin into the blood stream which causes toxic disturbance. Delay in anæsthesia, especially in the case of nerve blocking is directly attributable to this cause, in turn brought about by the highly acid solution.

I have found accordingly that with a less acid solution and particularly a solution which has a pH of 5.7 or over (the approximate critical acid value of blood) the objections mentioned above are substantially avoided. I have found it important to modify the less acid solutions in order on the one hand to secure a proper buffering or neutralizing effect and on the other hand to dissolve and avoid decomposition of the substance epinephrin. I have also found that with these less acid solutions the rate of diffusion may be increased by using solutions having a higher density than have heretofore been in use.

In accordance with my invention I have thus found that objectionable effects of solutions heretofore employed may be overcome or substantially lessened by suitable regulation of the acidity or pH content and of the density of the material, suitable buffering agents being employed, and when epinephrin or the like is used a suitable solvent and agent for preventing decomposition thereof being used.

As mentioned above my research has indicated that when a solution is used which has a pH of 5.7 or over—the critical acid value of blood—results in accordance with my invention are obtained. The pH of blood is about 7.4. A solution with a pH approximating that of blood or accordingly about neutral I have found gives better results than one just above the critical acid value. I prefer to use a solution having an acid value of pH 6.4 approximately. I have found that with such solutions the density should be increased above Sp. Gr. 1.0093 which is the usual gravity of procaine epinephrin solution in use today. With a solution of pH 6.4 optimum results in animal and clinic tests were obtained with a solution having a specific gravity of 1.0110. These factors of hydrogen ion concentration and specific gravity I find are inter-dependent. Solutions of high specific gravity and low pH number do not apear to function properly while solutions of high pH number and low specific gravity also appear to function improperly.

Instead of the high acid concentrations to prevent the decomposition of epinephrin or similar substances, I have found that I may preserve this material by the use of sodium bisulfite or equivalent anti-oxidizing agent having a low acidity, and compatible with the body fluids and with the other ingredients of the composition set forth below. With the use of this material I find that epinephrin, which will ordinarily decompose in a few hours exposure to the sunlight in a solution where the hydrogen ion concentration is about 6.4, is substantially as well preserved as in more highly acid solutions now in use.

As pointed out above it is important to buffer the solution with salts which are compatible with body fluids and with epinephrin where used at the hydrogen ion concentration selected. I prefer to employ a phosphate such as an alkali acid phosphate as one of the buffering components since this material approximates in its action more nearly the buffering action of the normal body fluids. I prefer di-sodium phosphate and potassium di-hydrogen phosphate as the buffer in connection with the composition for local anæsthesia. With this material I also employ a chloride such as sodium chloride or the like to buffer the hydrochloric acid of the procaine hydrochloride, where used, tending to maintain the hydrogen concentration due to this hydrochloric acid substantially constant.

As a preferred formula which has been successfully used for local anæsthesia, I employ the following:—20 grams of procaine hydrochloride, .022 gram molar di-sodium phosphate, .005 gram molar di-hydrogen potassium phosphate, .1 molar gram sodium chloride, .025 molar gram sodium bisulfite, 2 c. c. of N/1000 phosphoric acid and .052 gram of epinephrin were combined with sufficient water to make one liter.

The solution so made up has a specific gravity of approximately 1.0110 and a pH value of 6.4. At about this pH value, namely approximating that of blood, the anæsthesia is produced with great rapidity due to the fact that diffusion proceeds much more rapidly. The hydrogen ion determinations mentioned herein have been made on a standard Hellige Klett machine using a standard method of procedure. The solution has a tonicity permitting it to be readily absorbed by the body fluids and tissues and does not occasion hemolysis. The epinephrin contained therein has been found to remain unoxidized even when exposed to sunlight in the same manner as the solutions at present employed of high acid content. When tested clinically it has been found to produce anæsthesia rapidly the necrosis swelling and after-pain practically disappear, toxic symptoms are substantially absent and the recovery from the effect of the local anæsthesia is practically uneventful.

It is to be understood that other materials may be substituted for those in the formula given above, as long as the hydrogen ion concentration is maintained at or near the preferred pH value given. I find that a satisfactory range of operation of pH values is from about 5.7 to 8.0. With this pH value a specific gravity of 1.0110 and above should be employed. Instead of the phosphates mentioned in the formula, acetates, tartrates, carbonates and citrates may be employed.

The following represent combinations which have been used to replace the mixture of di-sodium phosphate, di-hydrogen potassium phosphate, and sodium chloride appearing in the preferred formula:—

1. Sodium, potassium and calcium tartrates buffered with tartaric acid and sodium chloride;
2. Sodium, calcium and potassium acetate buffered with acetic acid and sodium chloride;
3. Sodium, calcium and potassium citrate with caustic soda and hydrochloric acid;
4. Citric acid with di-sodium phosphate;
5. Mono-, di-, and tri-sodium phosphate with potassium acid phosphate and phosphoric acid;
6. Carbonates of sodium, potassium and calcium with hydrochloric acid;
7. Other substances buffered to give a pH range from 5.7 to 8.0 may be employed.

Instead of the hydrochloric acid salt of procaine, other acid salts thereof such as the nitrate and the sulfate may be used.

While I have described my improvements in great detail and with respect to preferred forms thereof, I do not desire to be limited to such details and forms since many changes and modifications may be made and the invention embodied in widely different forms without departing from the spirit and scope thereof in its broader aspects. Hence I desire to cover all modifications, forms and embodiments coming within the language or scope of any one or more of the appended claims.

What I claim as new and desire to secure by Letters Patent, is:—

1. An anæsthetic solution for hypodermic injection containing a solvent, an acid containing anæsthetic material for local anæsthetic, a vaso-constricting material and a buffer including a weak acid to dissolve and maintain said vaso-constricting material in solution and to modify the pH of the solution, said solution being substantially stable and having a pH value in a range from approximately 5.7 up to approximately neutral.

2. An anæsthetic solution for hypodermic injection containing a solvent, an acid salt anæsthetic material for local anæsthesia, a vaso-constricting material and a buffer including a buffer salt and an added acid to dissolve and maintain said vaso-constricting material in solution and to modify the pH of the solution, said solution being substantially stable and having a pH value from about 5.7 up to approximately neutral.

3. An anæsthetic solution for hypodermic injection containing a solvent, an acid salt of an anæsthetic material for local anæsthesia, a vaso-constricting material and a buffer containing an alkaline material, an acid to dissolve and maintain said vaso-constricting material in solution and a salt to modify the tonicity of the solution, said buffer ingredients being in proportion such that the pH value of the solution is in a range of approximately that of the critical acid value of the blood up to approximately neutral.

4. An anæsthetic solution ranging from slightly acid to nearly neutral containing an anæsthetic acid salt for local anæsthesia, a buffer, a vaso-constricting material, a weak acid to dissolve the vaso-constricting material and an anti-oxidant.

5. An anæsthetic solution ranging from slightly acid to nearly neutral containing an anæsthetic acid salt for local anæsthesia, an alkaline buffer, epinephrin, a weak acid to dissolve said epinephrin selected from the group acetic acid, tartaric acid, citric acid and phosphoric acid and an anti-oxidant.

6. An anæsthetic solution for hypodermic injection, containing a solvent, procaine in the form of the usual hydrochloric acid salt, epinephrin, a buffer material containing an alkaline salt to reduce the acidity due to the procaine hydrochloride, an anti-oxidizing agent for preventing oxidation of the epinephrin, the solution having a pH value somewhat lower than that of blood but appreciably higher than that of a correspondingly concentrated solution of said procaine hydrochloride, said solution being substantially stable.

7. An anæsthetic solution for hypodermic injection, containing a solvent, procaine in the form of the usual hydrochloric acid salt, epinephrin, a buffer material containing a salt, and an anti-oxidizing agent for preventing oxidation of the epinephrin, the proportion of the ingredients being such that the pH value of the solution is equal to about 6.4 and the specific gravity thereof is about 1.0110 or more, said solution being substantially stable.

8. An anæsthetic solution for hypodermic injection containing procaine, di-sodium phosphate, di-hydrogen potassium phosphate, sodium chloride, sodium bisulfite, phosphoric acid, epinephrin and water, the proportion of the ingredients being such that the pH value of the solution is approximately 6.4.

9. A base composition for making a substantially stable anæsthetic solution for hypodermic injection, including acid-containing anæsthetic material for local anæsthesia and a buffer material containing a salt for altering the pH of the base when in solution, a vaso-constricting material and an anti-oxidant material, said base when placed in water being adapted to produce an anæsthetic solution having a pH value within a range from approximately that of the critical acid value of blood up to that of the blood itself.

10. A base composition for making a substantially stable anæsthetic solution for hypodermic injection containing procaine hydrochloride, epinephrin, an alkaline di-sulfite and a buffer material containing a phosphate and a weak acid, in proportions such that when placed in water to make an anæsthetic solution such solution will have a pH value in a range from approximately that of the critical acid value of the blood up to approximately that of the blood itself.

SAMUEL D. GOLDBERG.